April 12, 1955    C. W. MOTT    2,705,861
GROUND ROLLER MOUNTING FOR LAWN MOWER
Original Filed July 29, 1948    3 Sheets-Sheet 2

Inventor
Carl W. Mott
Paul O. Pippel
Atty

April 12, 1955  C. W. MOTT  2,705,861
GROUND ROLLER MOUNTING FOR LAWN MOWER
Original Filed July 29, 1948  3 Sheets-Sheet 3

Inventor
Carl W. Mott
Paul O. Pippel
Atty

United States Patent Office 2,705,861
Patented Apr. 12, 1955

2,705,861

GROUND ROLLER MOUNTING FOR LAWN MOWER

Carl W. Mott, Lake Ozark, Mo., assignor to International Harvester Company, a corporation of New Jersey Original application July 29, 1948, Serial No. 41,343. Divided and this application August 26, 1952, Serial No. 306,397

4 Claims. (Cl. 56—249)

This invention relates to power-driven lawn mowers and wherein there are features particularly useful in such mowers of the walk-behind type. This application is a division of my copending application, Serial No. 41,343, filed July 29, 1948, for Power-Driven Lawn Mower.

The embodiment herein disclosed for illustrating the invention comprises a frame mounted upon a running gear having motor-driven traction wheels spaced apart transversely of a rear portion of the frame. A power-driven grass-cutting rotor assembly extends across a front portion of the frame and has a plurality of knife-like flails pivotally mounted upon a rotatable carrier. When the rotor assembly is power driven the flails swing into the grass for cutting same and chopping it into short pieces. Handles for engagement by an operator walking behind the mower unit project upwardly and rearwardly from the rear portion of the frame. An internal combustion engine is carried by the frame as a power source for driving the traction wheels and the grass-cutting rotor assembly.

One object of the invention is the provision of a novel ground-engaging roller together with mounting means therefor upon the frame to facilitate adjustment of the distance between the grass-cutting rotor assembly and the ground surface whereby the length of the stubble of grass cut by the mower can be selectively regulated.

Another object is the provision of a grass-cutting mower with laterally spaced forward side frame portions having a traction wheel support, a grass-stem-engaging bar mounted upon and extended between said forward frame portions in contiguity with the ground, and a grass-cutting rotor structure supported by and between the laterally spaced frame portions, such rotor structure including grass-cutting flails of which tips extend radially from the rotational axis of the rotor structure during rotation thereof and traverse a linear nadir zone contiguously above and in parallelism with said bar to cooperate therewith in cutting grass stems during rotor rotation.

Still another object is the provision of a grass-cutting mower according to the next preceding object and wherein said bar rests slidably upon the ground to complement the traction wheels for dirigibly supporting the mower.

The above and other desirable more specific objects inherent in and encompassed by the invention will become apparent from the ensuing description, the appended claims, and the drawings, wherein:

Figure 1:
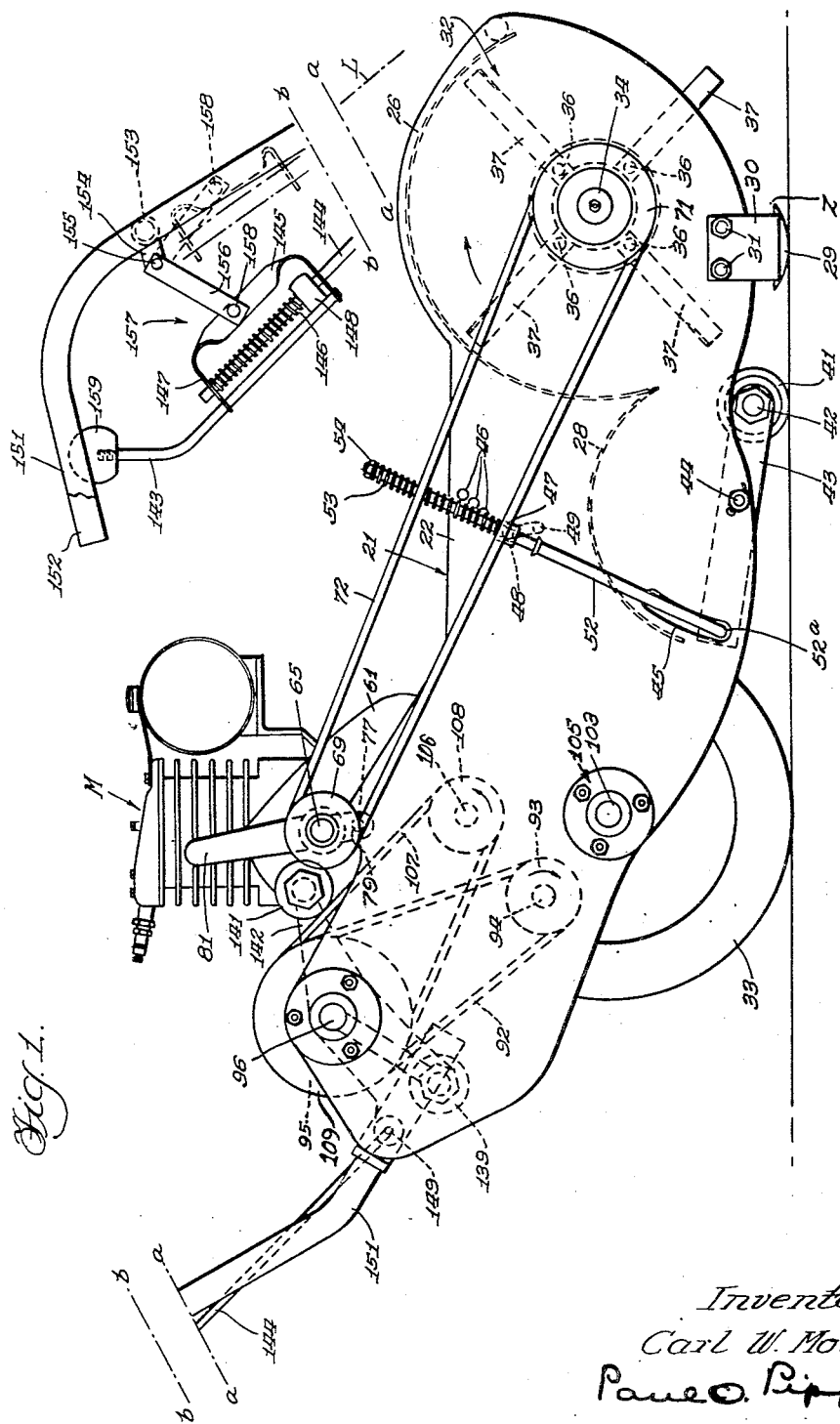
Fig. 1 is a side elevational broken view of a motor-driven walk-behind lawn mower embodying a preferred form of the invention.
Figure 2:
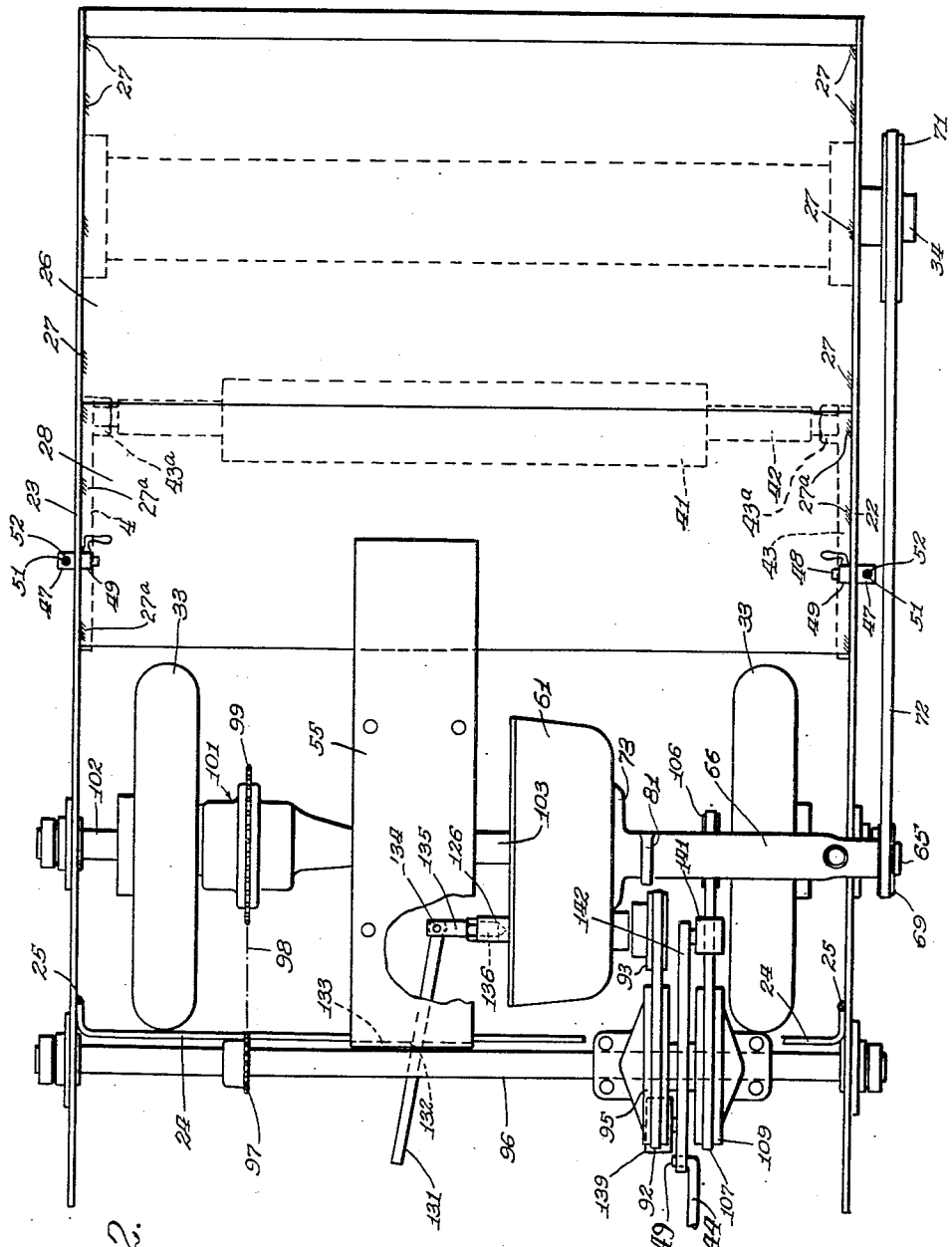
Fig. 2 is a plan view of the mower shown in Fig. 1, but omitting the control handles and the internal combustion engine.
Figure 3:
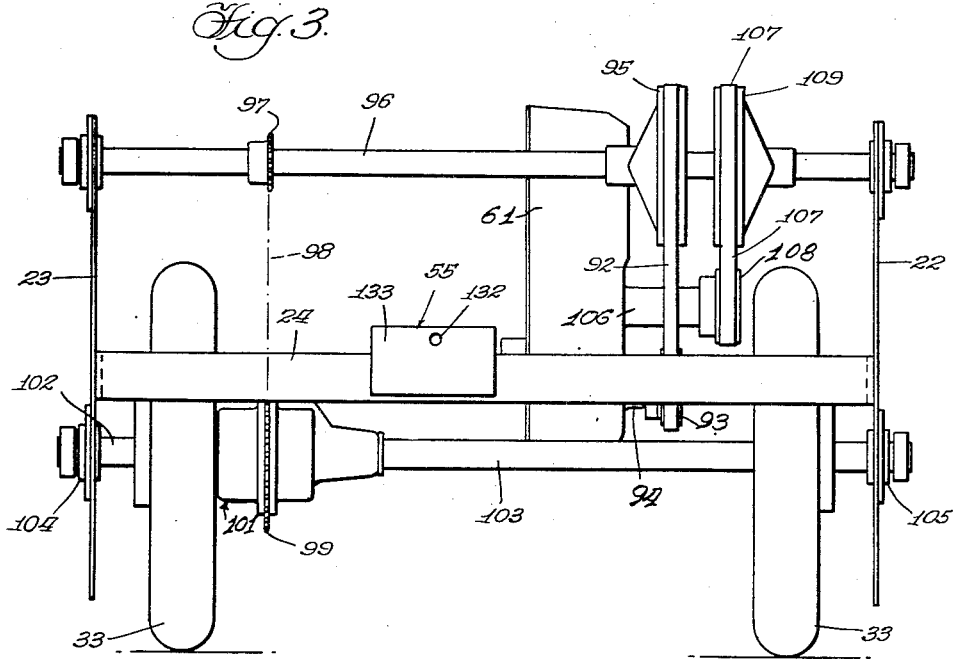
Fig. 3 is a rear elevational view of the mower frame, running gear, gear box, and forward and reverse drive belts through which power is transmittable from gearing in the gear box to the running gear.

With continued reference to the drawings and particularly to Figs. 1, 2 and 3, a frame 21 of the mower can be seen to comprise a pair of laterally spaced plate-like side frame members 22 and 23. These side frame members are connected together at rear edge portions by a cross-frame member 24. The cross-frame member 24 may be welded to the two side frame members as indicated at 25, in Fig. 2. A semi-cylindrical rotor shroud 26 extends between forward portions of the side frame members and constitutes means for rigidly connecting these members. The shroud 26 may be welded to the side frame members as shown at 27, in Fig. 2. A semi-cylindrical deflector extension 28 (see Fig. 1) of the shroud 26 also extends between the side frame members to which it is welded at its ends as shown at 27a to constitute a part of the frame and to rigidify same. A grass-stem-engaging runner bar 29, Figs. 1 and 4, has upturned end portions 30 respectively secured to the side frame members by bolts 31. This runner bar is directly beneath the grass-cutting rotor assembly 32 and limits the proximity with which said assembly can approach the ground. This runner bar is adapted to slide upon the ground and to cooperate with traction wheels 33 for supporting the frame.

Figure 4:
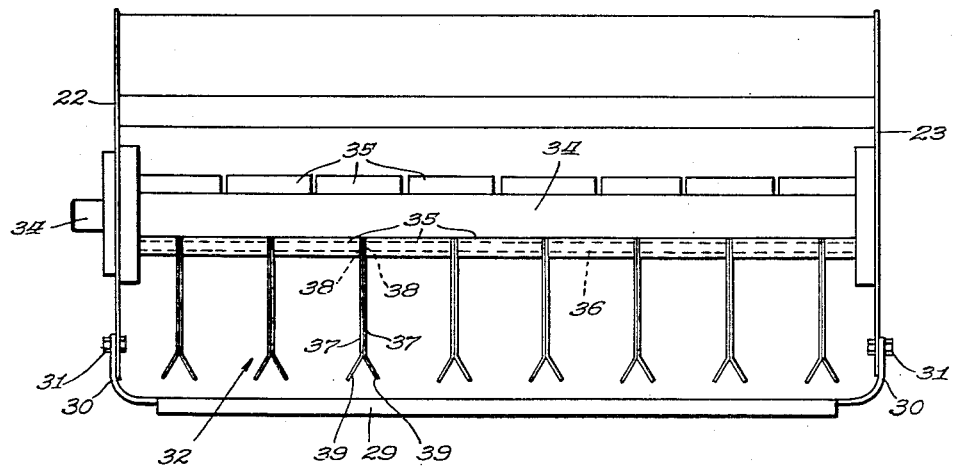
Fig. 4 is a front elevational view of the mower, illustrating the grass-cutting rotor assembly.

The rotor assembly 32 comprises a shaft 34 extending between and through the side frame members 22 and 23 wherein opposite end portions of such shaft are respectively journaled. There are four sets of axially aligned and axially spaced flail pivot rod holders 35 carried by the shaft 34. These sets of flail pivot rod holders are equally spaced circumferentially of the shaft. Flail pivot rods 36 are slid endwise respectively into these sets of axially aligned holders 35, the upper set of the holders 35 illustrated in Fig. 4 having the rod withdrawn therefrom. Prior to the endwise insertion of each rod 35 into the tubular holders 35 therefor, pairs of grass-cutting flails 37 will be placed in back-to-back relation as illustrated in Fig. 4, and have apertures 38 in shank portions thereof aligned with and disposed between axially spaced ends of the holders 35 so that as the rod is slid into place in the holders it will pass through the apertured shanks of the flails to provide a pivotal support thereto. During rotation of the rotor assembly the flails 37 will be caused to swing radially outwardly from the axis of the shaft 34, as illustrated in Fig. 1, because of centrifugal force. Diverging end portions or tips 39 of each pair of back-to-back arranged flails 37 collide with and cut the grass when the rotor assembly is rotated at high speed. The circular path of these flail tips cross a linear nadir zone appearing as a point Z in Fig. 1 extending in contiguous parallelism with the stem holding runner bar 29 to cooperate therewith in clipping grass stems immediately above such bar.

Locomotion of the mower over the ground surface is made easier by a ground-engaging roller 41 which is rotatively carried upon a shaft 42 having its opposite ends mounted in forward end portions 43a of levers 43. These levers 43 are mounted adjacently to the inner sides of the side frame members 22 and 23 where they are pivotally carried upon bolts 44. Each side frame member 22 and 23 has an upwardly extending slot 45 adjacently to the rear end portion of the associated lever 43. A plurality of vertically spaced openings 46 is in each of the side frame members 22 and 23, above the slot 45 therein. A spring mounting member having a head 47 and a shank 48 is associated with each set of openings 46. The shank 48 of each headed spring mounting member is inserted in one of the associated openings 46. Subsequent to insertion of the shanks 48 through a selected opening 46, a crank nut 49 is turned thereonto, as illustrated in Fig. 2.

A bearing 51 in each spring mounting member head 47 slidably receives a vertical rod 52. The lower end portion of each rod is turned laterally and inserted inwardly through the associated frame member slot 45 into pivotal connection 52a with the rear end of the associated rockable lever 43. An upper end portion of each rod 52 above the spring mounting member 47 is surrounded by a helical expansion spring 53 which reacts between its associated head 47 and a nut 54 on the upper end of its associated rod 52 for urging the rod upwardly, thereby urging the levers 43 to pivot in the direction carrying the front ends thereof downwardly for pressing the ground-engaging roller 41 against the ground. In this manner weight of the mower is transferred from the runner bar 29 onto the ground-engaging roller, thereby diminishing frictional engagement of the runner bar with the ground and diminishing the tractive force necessary for causing movement of the mower over the ground surface.

Should it be desired to cause the grass to be cut at greater length than the shortest length possible when the runner bar slides along the ground surface, spring mounting members having heads 47 will be moved upwardly into higher of the openings 46 for causing sufficient downward displacement of the ground-engaging roller 41 for transferring all of the weight from the runner bar onto such roller and selectively raising the runner bar above the ground surface.

A motor M for driving the grass-cutting rotor assembly 32, and also for driving the traction wheels 33 of the mower, is mounted upon a motor-supporting platform 55, Figs. 2 and 3. The rear end of the platform 55 is supported upon the transverse frame member 24, whereas the forward end of such platform is mounted upon the shroud extension 28.

The motor M herein illustrated is an internal combustion engine. A gear box 61 contains gearing (not shown) driven from the engine. Such gearing drives a shaft 65 extending through a long tubular bearing 66 therefor which is integral with a bearing plate 73 mounted in the casing for oscillative movement about a horizontal axis in parallelism with but below the shaft 65. Said axis is coaxial with a pivot pin 79, Fig. 1, mounted in the side frame 22 and pivotally supporting the outer end of the outboard bearing 66 by virtue of a short arm 77 projecting downwardly from the bearing into a pivotal mounting upon the pin 79. A handle 81 integral with the outboard bearing 66 is manipulatable for rocking the bearing plate 73, bearing 66 and the arm 77 about the pivot axis coaxial with the pin 79. A pulley 69, Figs. 1 and 2, is mounted on and constrained for rotation with the outer end portion of the shaft 65. Pulley 69 is disposed in a common plane with a pulley 71 mounted on and constrained for rotation with an outer end portion of the rotor assembly shaft 34. A belt 72 trained over the pulleys 69 and 71 is adapted to transmit driving force from the pulley 69 to the pulley 71 when this belt is tightened by rearward displacement of the outboard bearing 66 about the axis of the pin 79. Means unrelated to this invention, but disclosed in the parent application Serial No. 41,343, is provided for holding the bearing 66 rearwardly displaced following such displacement by use of the handle 81.

Forward motion of the mower is obtained by power derived from the motor M when a "forward" belt 92 is tightened in driving relation between a "forward" pulley 93 mounted on the outer end of a driven shaft 94 projecting outwardly from the gear box 61. When so tightened the belt 92 will transmit power from the pulley 93 to a pulley 95 which is mounted on and constrained for rotation with a cross shaft 96. This cross shaft carries a sprocket 97 for rotation therewith and from which power is transmitted through a chain 98 to a sprocket 99 incorporated into a differential casing 101. When the casing 101 is rotated, it causes differential rotation of axle shafts 102 and 103 projecting oppositely therefrom. The traction wheels 33 are respectively secured to the axle shafts 102 and 103. The axle shafts 102 and 103 which constitute a traction wheel shaft structure 102—103 are carried rotatively in bearing units 104 and 105 which are supported in side frame members 23 and 22 of the mower frame. A running gear for the mower includes the two shafts 102 and 103 and the two traction wheels 33.

Power is transmitted from a "reverse" pulley shaft 106, Fig. 1, to the cross shaft 96 and thence to the running gear of the mower only when the "forward" belt 92 is loosened and a "reverse" belt 107 is tightened in driving relation upon a "reverse" pulley 108, fixed to the shaft 106, and a pulley 109 fixed for rotation with cross shaft 96.

The "forward" pulley shaft 94 and the "reverse" pulley shaft 106 are driven in opposite directions through gearing in the gear box 61. Shaft 106 is constantly driven while the motor M is operating whereas the "forward" shaft is driven at different speeds selectable by adjusting the endwise position of a shifter rod 126, Fig. 2, projecting horizontally from the gear box. Shifter rod 126 is controlled by a shifter lever 131, Fig. 2, projecting forwardly through a hole 132 in a dependent flange 133 at the rear end of the motor supporting platform 55. The forward end of the lever 131 is pivotally connected at 134 with a member 135 which has a threaded shank portion turned into a threaded recess 136 in the outer end of the shifter rod 126.

Selective tightening and loosening of the "forward" and "reverse" drive belts 92 and 107 is accomplished by means of belt tightening idlers 139 and 141 rotatively disposed upon a carrier member 142, which is rockably mounted upon the cross shaft 96. This oppositely movable or rockable member 142 normally depends in a neutral position illustrated in Fig. 1 where neither of the idlers 139 nor 141 presses against its respectively associated belt for tightening the same. Rocking the pivoted member 142 counter-clockwise, as viewed in Fig. 1, will displace the idler 141 more distantly from its associated belt 107 while placing the idler 139 in belt tightening relation with respect to the "forward" belt 92. Clockwise pivoting of the member 142 from the neutral position shown in Fig. 1 will move the idler 139 farther from its associated belt 92 pursuant to carrying the idler 141 into belt tightening relation with the "reverse" belt 107.

Rocking of the idler carrier member 142 selectively to and from the positions on opposite sides of the neutral is accomplished by manipulating a control element 143, Fig. 1, and a rod element 144 which is connected to the element 143 by an inverted U-shaped bracket 145 slidably on the rod 144, and a helical spring 146 disposed between an end portion 147 of the bracket and a stop 148 on the rod 144. The lower end of the rod 144 is pivotally connected with the idler carrier 142 by a part 149. Handle members 151 and 152 respectively connected with rear end portions of the side frame members 22 and 23 are interconnected by a transverse tubular brace member 153, Fig. 1. This brace member 153, together with handles 151 and 152, serves as a control support for supporting the control mechanism for the belt tightening idlers. A bracket 154 mounted on the transverse member 153 pivotally supports, at 155, a pendulous pivot element 156 of toggle mechanism which, in addition to including said element 156, also includes the rod element 144 and an articulated joint structure 157 interconnecting said elements 156 and 144. Said joint structure 157 includes a pivot connection 158 between the pendulous element 156 and the inverted U-shaped bracket 145.

The toggle mechanism is illustrated in Fig. 1 in a relaxed condition which permits the pendulous belt tightener idler carrier 142 to depend idly in the neutral position. Should the operator desire to cause the mower to move forwardly, he will grasp a knob 159 on the control element 143 and press forwardly upon this knob. This will cause the pivot 158 of the toggle mechanism to swing forwardly to the dotted line position illustrated in Fig. 1, carrying the pivot 158 above and forwardly of a center line L passing through the pivot 155 and the pivot 149 at the lower end of the rod 144. As the toggle mechanism is swung forwardly and upwardly to such dotted line position the rod 144 will be moved endwise downwardly for pivoting the carrier 142 counter-clockwise and disposing the belt-tightening idler 139 in tightening relation with the lower flight of the "forward" belt 92. During this forward and upward displacement of the toggle mechanism, the upper leg 147 of the U-shaped bracket 145 will compress the spring 146 and after the pivot 158 crosses the center line L, the compressed spring 146 will tend to continue counterclockwise swinging of the element 156 to a limit determined by abutment of the control element 143 with the pivot pin 155. With the "forward" belt 92 thus tightened and with the toggle mechanism retained in this over-center position, the motor will be drivingly connected with the traction wheels of the mower for causing forward movement thereof. Forward motion of the vehicle will continue until the operator exerts a rearward force on the knob 159 for swinging the toggle mechanism into the Fig. 1 position.

Rearward movement of the mower under power derived from the motor M is obtained by manual movement of the control element knob 159 rearward. This pulls the rod 144 rearwardly and upwardly and thereby rocks the idler carrier 142 clockwise, as viewed in Fig. 1, for placing the idler 141 in belt tightening relation with the upper flight of the "reverse" belt 107. As soon as the rearward manually applied force is relieved from the knob 159, the pendulously-supported toggle mechanism will swing forwardly together with the pendulous carrier 142 for reestablishing the neutral condition in which neither of the belts 92 nor 107 is tightened.

Having described a preferred form of the invention with the view of clearly and concisely illustrating the same, I claim:

1. In a grass-cutting mower, a frame having laterally spaced fore and aft extending side frame members, traction wheels supporting a rear portion of the frame, a grass-cutting rotor mounted in a forward portion of the frame between said side frame members, a ground-engaging runner bar having end portions secured respectively to said side frame members and extending beneath the rotor transversely between the side frame members to limit approach of the rotor to the ground surface, and means for diminishing pressure from the runner bar on the ground surface while such bar remains on the ground surface and without actually lifting the frame comprising a ground-engaging roller disposed transversely of and between the side frame members rearwardly of such bar and forwardly of said rear portion of the frame, means mounting said roller upon the frame for vertical movement with respect thereto, and means reacting upon the frame for yieldably urging the roller downwardly into engagement with the ground surface with a force less than required to lift the frame.

2. In a grass-cutting mower, a frame having laterally-spaced side frame members extending fore and aft thereof, traction wheels supporting a rear portion of the frame, a grass-cutting rotor mounted in and extending between forward end portions of said side frame members, a ground-engaging runner bar extending between the side frame members substantially beneath the rotor to slide upon the ground surface and limit approach of the rotor toward such surface, levers respectively mounted upon the side frame members for pivoting about a common transverse axis disposed rearwardly of the rotor and forwardly of said frame rear portion, a ground-engaging roller extending between said levers and journalled therein, said levers being pivotal in one direction to increase pressure of the ground-engaging roller upon the ground surface and thereby shift weight of the mower from the runner bar onto said roller, spring mountings respectively upon said side frame members, springs upon said mountings, means interconnecting the springs with said levers, and said springs being biased to react between said mountings and said interconnecting means for urging the levers to pivot in the one direction with a force insufficient to lift the frame and displace the runner bar from the ground surface.

3. The combination set forth in claim 2 wherein there is means for changing the position of the spring mountings upon the side frame members as an expedient for adjusting the magnitude of the biasing force of the springs and consequently adjusting the proportion of the weight of the mower carried by the ground-engaging roller.

4. In a mounting for a ground-engaging roller for a grass-cutting mower having laterally-spaced fore and aft extending side frame members and wherein said side frame members are in the form of upright plates having upwardly extending slots adjacently to lower edge portions thereof and vertically-spaced openings thereabove; substantially horizontal levers disposed respectively adjacently to inner sides of the side frame members and pivotally mounted thereon for pivoting about a transverse axis at intermediate sections of the levers, a ground-engaging roller extending transversely of and journalled upon portions of the levers extending forwardly from their pivotal mountings, said levers having rear end portions disposed rearwardly from their pivotal mountings, spring mounting members having bearing-containing heads disposed exteriorally of said side frame members and shanks extending from said heads into selective of the vertically-spaced openings, upright rods respectively exteriorally of the side frame members, each rod having a lower end portion turned laterally therefrom and extending inwardly through the slot in its associated side frame member into pivotal connection with the rear-end portion of the associated roller supporting lever, each rod extending through the bearing in the associated spring mounting member and being reciprocable in such bearing, and helical expansion springs disposed about upper-end portions of rods, above said bearing containing heads and reacting between such heads and upper-end portions of the rods for urging the rods endwise upwardly in the bearings and consequently pressing the ground-engaging roller downwardly against the ground surface.

References Cited in the file of this patent

UNITED STATES PATENTS

| | | |
|---|---|---|
| 818,301 | Sayre | Apr. 17, 1906 |
| 2,013,597 | Blydenburgh | Sept. 3, 1935 |
| 2,032,784 | Worthington | Mar. 3, 1936 |
| 2,506,054 | Agee et al. | May 2, 1950 |
| 2,589,845 | Mott | Mar. 18, 1952 |
| 2,620,613 | Bradley | Dec. 9, 1952 |